US009335030B2

(12) United States Patent
Winters

(10) Patent No.: US 9,335,030 B2
(45) Date of Patent: May 10, 2016

(54) LIGHTING FIXTURE HOUSING

(71) Applicant: Philip Dean Winters, Senoia, GA (US)

(72) Inventor: Philip Dean Winters, Senoia, GA (US)

(73) Assignee: Cooper Technologies Company, Houston, TX (US)

( * ) Notice: Subject to any disclaimer, the term of this patent is extended or adjusted under 35 U.S.C. 154(b) by 79 days.

(21) Appl. No.: 14/470,741

(22) Filed: Aug. 27, 2014

(65) Prior Publication Data

US 2016/0061421 A1 Mar. 3, 2016

(51) Int. Cl.

| | |
|---|---|
| ***B60Q 1/06*** | (2006.01) |
| ***F21V 29/00*** | (2015.01) |
| ***F21V 15/01*** | (2006.01) |
| ***F21V 23/00*** | (2015.01) |
| ***F21V 7/00*** | (2006.01) |
| ***F21V 13/04*** | (2006.01) |

(52) U.S. Cl.

CPC ................. *F21V 15/011* (2013.01); *F21V 7/00* (2013.01); *F21V 13/04* (2013.01); *F21V 15/01* (2013.01); *F21V 23/00* (2013.01)

(58) Field of Classification Search

CPC ......... F21V 15/011; F21V 13/04; F21V 7/00; F21V 23/00; F21V 15/01; F21V 29/004; F21V 29/02; F21V 29/2293; H01J 19/42; H01J 61/52; H01J 61/35; H01J 61/045; H01J 61/523; H05K 7/20963; F21Y 2101/02; F21K 9/00

USPC ............................... 313/46–47; 362/362–375

See application file for complete search history.

(56) References Cited

U.S. PATENT DOCUMENTS

| | | | | |
|---|---|---|---|---|
| 6,577,504 B1 * | 6/2003 | Lofland | H01L 23/3672 | 165/185 |
| 2006/0187652 A1 * | 8/2006 | Doyle | F21S 8/00 | 362/96 |
| 2014/0293545 A1 * | 10/2014 | Diep | H05K 7/20436 | 361/709 |

* cited by examiner

*Primary Examiner* — Anne Hines
*Assistant Examiner* — Jose M Diaz
(74) *Attorney, Agent, or Firm* — King & Spalding LLP

(57) ABSTRACT

A heat dissipating housing for a lighting device includes a back wall comprising an upper section and a lower section. The housing further includes a sidewall extending down from the upper section of the back wall. The back wall and the sidewall define a cavity of the housing. The upper section of the back wall is elevated from the lower section of the back wall such that when a printed circuit board (PCB) is in contact with the lower section of the back wall within the cavity, an uninsulated electrical element on a back side of the PCB is separated by an air gap from a closest point on the housing by a distance that is at least 0.063 inch. The back side of the PCB faces the upper section of the back wall.

20 Claims, 4 Drawing Sheets

LIGHTING FIXTURE HOUSING

TECHNICAL FIELD

The present disclosure relates generally to lighting solutions, and more particularly to a housing for a high voltage printed circuit board of a lighting fixture.

BACKGROUND

A lighting fixture may include a printed circuit board (PCB) and light sources (e.g., light emitting diodes (LEDs)) that are attached to the PCB. Other components such as capacitors and regulators may also be attached to the PCB. Typically, heat is generated by wire traces and other elements of the PCB that carry current between components attached to the PCB. Heat may also be produced by the light sources and the other electrical components that are attached to PCB. In some light fixtures, a heat sink may be used to dissipate heat from the PCB. For example, a metal heat sink that is positioned close to the PCB may allow for efficient transfer of heat from the PCB to the heat sink. However, because a PCB includes current carrying elements (i.e., wire traces, etc.), an air gap may be required between uninsulated current carrying elements of the PCB and the metal heat sink. Further, an air gap may be required between current carrying components attached to the PCB and the metal heat sink. For example, Underwriters Laboratories (UL) spacing requirements require minimum air gap spacing between uninsulated current carrying elements and a metal heat sink. Because of such air gap spacing requirements, heat may not be efficiently transferred from the PCB to the heat sink.

Accordingly, a housing of a light fixture that allows for efficient transfer of heat from the PCB to the housing for dissipation of the heat by the housing is desirable.

SUMMARY

In general, the present disclosure relates to lighting solutions, and more particularly to a housing for a high voltage printed circuit board of a lighting fixture. In an example embodiment, a heat dissipating housing for a lighting device includes a back wall comprising an upper section and a lower section. The housing further includes a sidewall extending down from the upper section of the back wall. The back wall and the sidewall define a cavity of the housing. The upper section of the back wall is elevated from the lower section of the back wall such that when a printed circuit board (PCB) is in contact with the lower section of the back wall within the cavity, an uninsulated electrical element on a back side of the PCB is separated by an air gap from a closest point on the housing by a distance that is at least 0.063 inch. The back side of the PCB faces the upper section of the back wall.

In another example embodiment, a lighting device includes a housing having a back wall and a sidewall. The back wall and the sidewall define a cavity of the housing. The back wall includes an upper section and a lower section. The lighting device further includes a printed circuit board (PCB) disposed within the cavity of the housing. An attachment section of the PCB is in contact with the lower section of the back wall. An uninsulated section of the PCB extends from the attachment section of the PCB and includes an uninsulated electrical element on a back side of the PCB. The back side of the PCB faces the upper section of the back wall. The uninsulated electrical element is separated by an air gap from a closest point on the housing by a distance that is at least 0.063 inch.

In another example embodiment, a lighting device includes a housing having a back wall and a sidewall. The back wall and the sidewall define a cavity of the housing. The back wall includes an upper section and a lower section. The lighting device further includes a printed circuit board (PCB) disposed within the cavity of the housing. An attachment section of the PCB is in contact with the lower section of the back wall. An uninsulated section of the PCB extends from the attachment section of the PCB and includes an uninsulated electrical element on a back side of the PCB. The back side of the PCB faces the upper section of the back wall. The uninsulated electrical element is separated by an air gap from a closest point on the housing by a distance that is at least 0.063 inch. The lighting device also includes a light source attached to the attachment section of the PCB on a front side of the PCB. The front side of the PCB faces away from the upper section of the back wall.

These and other aspects, objects, features, and embodiments will be apparent from the following description and the claims.

BRIEF DESCRIPTION OF THE DRAWINGS

Reference will now be made to the accompanying drawings, which are not necessarily drawn to scale, and wherein.

Figure 1:
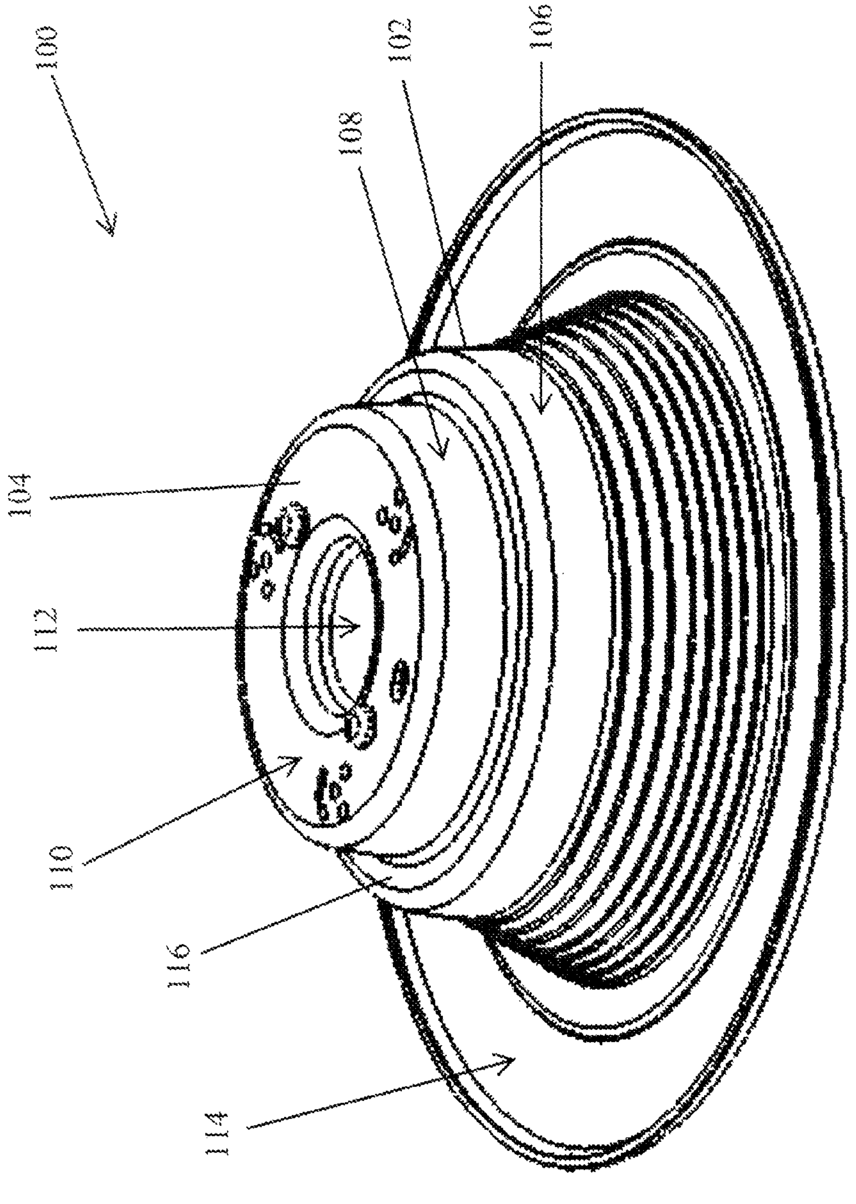
FIG. 1 illustrates a housing 100 of a lighting fixture that provides an enclosure to a printed circuit board (PCB) of the light fixture and dissipates heat from the PCB according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, particular embodiments are described. FIG. 1 illustrates a housing 100 of a lighting fixture that provides an enclosure to a printed circuit board (PCB) of the light fixture and dissipates heat from the PCB according to an example embodiment. As shown in FIG. 1, the housing 100 includes a sidewall 102 and a back wall 104. The sidewall 102 may be an enclosed sidewall as illustrated in FIG. 1. The sidewall 102 may include a bottom sidewall section 106 and a top sidewall section 108. A transition section 116 may extend between the bottom section 106 and the top section

108. For example, the second sidewall section 108 may be smaller than the first sidewall 106.

In some example embodiments, the back wall 104 includes an upper section 110 and a lower section 112. For example, the sidewall 102 may extend down from the upper section 110 of the back wall 104. In particular, the sidewall 102 of the housing 100 may extend down from an outer perimeter of the upper section 110 of the back wall 104.

As illustrated in FIG. 1, the upper section 110 is elevated relative to the lower section 112. To illustrate, the upper section 110 may be elevated such that when a printed circuit board (PCB) is attached to the lower section 112 within a cavity of the housing 100, the upper section 110 may be separated from current carrying elements of the PCB by an air gap. As described below with respect to FIG. 2, the air gap may provide adequate spacing between the housing 100 and current carrying elements that are attached to the PCB to meet UL spacing requirements for a high voltage PCB.

As illustrated in FIG. 1, the lower section 112 may be centrally located on the back wall 104. Alternatively, the lower section 112 may be located proximal to an outer perimeter of the back wall 104. Although the lower section 112 is shown in FIG. 1 as having a substantially circular shape, in alternative embodiments, the lower section 112 may have another shape. For example, the lower section 112 may have a rectangular shape without departing from the scope of this disclosure. Further, the upper section 110 of the back wall 104 may have circular and/or non-circular perimeters.

In some example embodiments, the housing 100 may also include a flange 114 extending out from the sidewall 106. In particular, the flange 114 may extend outwardly at a bottom end of the sidewall 102. For example, the flange 114 may abut against a ceiling when the housing 100 is recessed into an opening of the ceiling.

The housing 100 may be made from a material such as a metal. For example, the housing 100 may be made from a metal that has good heat conducting properties. Because the housing 100 provides an enclosure to components (e.g., PCB) of a lighting fixture and also serves as a heat sink to dissipate heat from the components, the housing 102 may be made from a metal such as aluminum, which is an efficient heat conductor. The housing 100 may be designed to have a desired thermal rating to tolerate the heat generated by the components of the lighting fixture. For example, the housing 100 may have a 5VA thermal rating. In some example embodiments, the housing 102 may be made by spinning, hydroforming and/or stamping/drawing processes. To illustrate, the housing 100 may be made from aluminum as a single piece using spinning, hydroforming and/or stamping/drawing processes. Alternatively, the housing 100 may be made from multiple individual pieces that are produced individually and subsequently attached to each other. For example, the sidewall 102 and the back wall 104 may be made separately and subsequently attached to each other to produce the housing 100.

Although the sidewall 102 includes the bottom section 106 and the top section 108 as shown in FIG. 1, in alternative embodiments, the sidewall 102 may include a single sidewall section or more than two sidewall sections. Further, although a portion of the sidewall 102 is slanted in an upward direction relative to the flange 114, in alternative embodiments, the sidewall 102 may be substantially perpendicular to the flange 114. Further, the sidewall 102 may be enclosed to form shapes other than the shape shown in FIG. 1. For example, the sidewall 102 may be enclosed to form a rectangular shape. Further, housing 100 may have multiple upper sections 110 and/or multiple lower sections 112.

Figure 2:
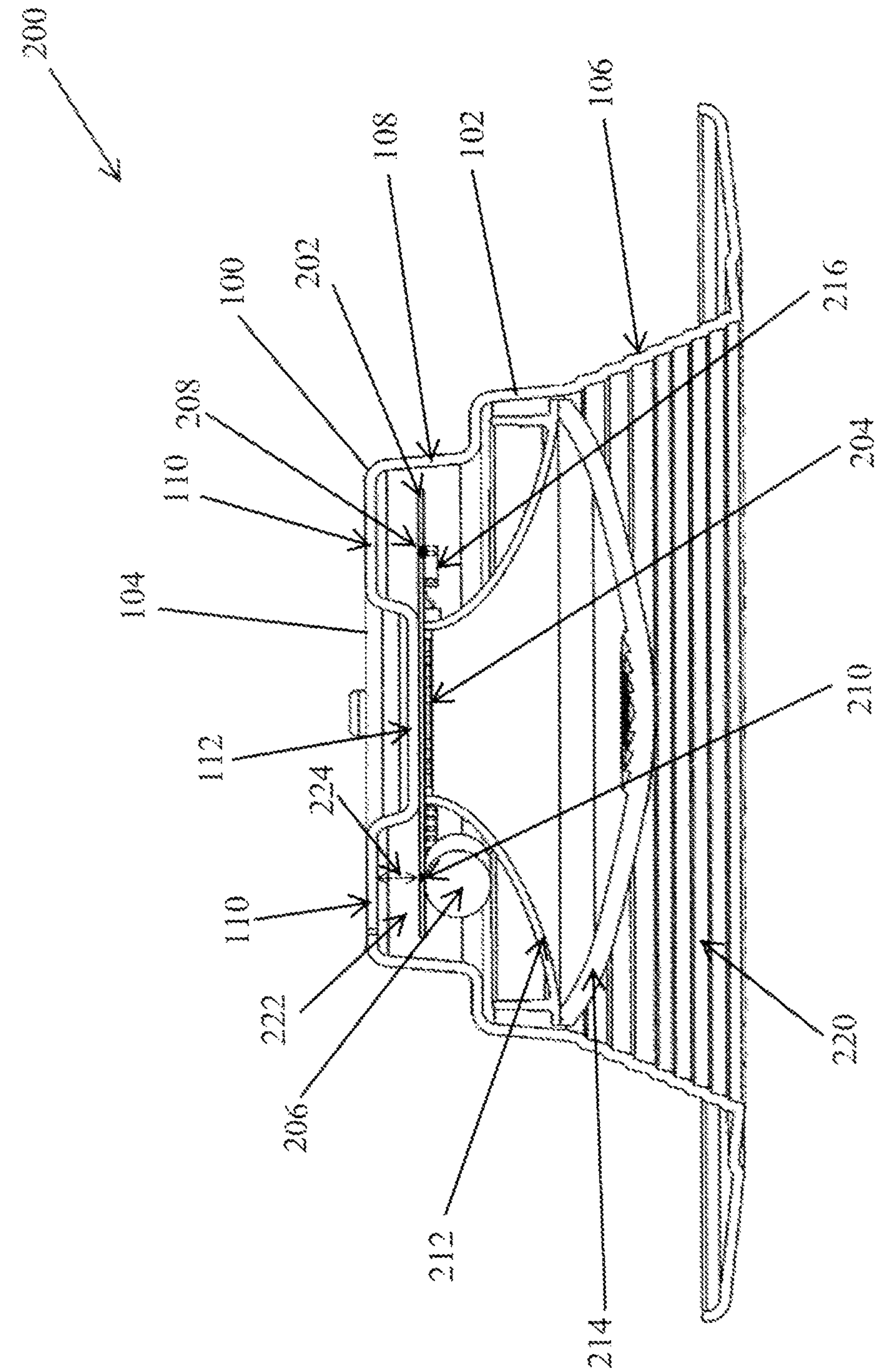
FIG. 2 illustrates cross-sectional view of a lighting fixture including the housing of FIG. 1 according to an example embodiment.

FIG. 2 illustrates cross-sectional view of a lighting fixture 200 including the housing 100 of FIG. 1 according to an example embodiment. As illustrated in FIG. 2, the lighting fixture 200 includes the housing 100, a printed circuit board (PCB) 202, a reflector 212, and a lens 214. The PCB 202, the reflector 212, and the lens 214 may be disposed within a cavity 220 of the housing 100.

As described above with respect to FIG. 1, the housing 100 includes the sidewall 102 and the back wall 104. The sidewall 102 and the back wall 104 define the cavity 220 of the housing 100. The sidewall 102 of the housing 100 includes the bottom section 106 and the top section 108. The back wall 104 of the housing 100 includes the upper section 110 and the lower section 112. In some example embodiments, the lens 214 may be attached to the reflector 212. For example, the reflector 212 may reflect light that reaches the reflector 212 from light emitting diodes (LEDs) 204 toward the lens 214. For example, the PCB 202 may include the light emitting diodes (LEDs) 204 on a front surface of the PCB 202 facing away from the lower section 112 of the back wall 104.

In some example embodiments, the PCB 202 may be attached to the lower section 112 of the back wall 104 within the cavity 220 of the housing 100. For example, a section of the PCB 202 may be in contact with the lower section 112 of the back wall 104. To illustrate, a portion of the back surface of the PCB 202 facing the lower section 112 of the back wall 104 may be in contact with at least a portion of the lower section 112 of the back wall 104. Because the housing 100 including the lower section 112 of the back wall 104 may be made from a metal, the portion of the back surface of PCB 202 that is in contact with the lower section 112 does not include uninsulated electrically conducting elements (e.g., exposed wire traces) that may result in electrifying the housing 100 or causing an electrical short. The LEDs 204 may be disposed on a portion of a front surface of the PCB 202 that is opposite to the portion of the back surface of the PCB that is in contact with the lower section 112 of the back wall 104.

In some example embodiments, one or more electrical components 206, 216 may be attached to the PCB 202. For example, the electrical components 206, 216 may be attached to the PCB 202 on a front side of the PCB 202. As illustrated in FIG. 2, the electrical components 206, 216 may be attached to a section of the PCB 202 that is not in direct contact with the lower section 112 of the back wall 104. For example, the electrical components 206, 216 may be attached to a section of the PCB 202 that extends out toward the sidewall 102 from the portion of the PCB 202 that is directly below the lower section 112 of the back wall 104.

In some example embodiments, uninsulated electrical elements 208, 210 may be disposed on the back side of the PCB 202. For example, each one of the uninsulated electrical elements 208, 210 may be an exposed (i.e., uninsulated) wire trace of the PCB 202 or an exposed attachment node at which a terminal of an electrical component such as the electrical components 206, 216 is attached (e.g., soldered) to the PCB 202.

As illustrated in FIG. 2, the uninsulated electrical elements 208, 210 may be on a portion of the PCB that is directly below the upper section 110 of the back wall 104. In particular, the uninsulated electrical elements 208, 210 are positioned on the PCB 202 such that an air gap separates the uninsulated electrical elements 208, 210 from the housing 100. To illustrate, because the upper section 110 of the back wall 104 is elevated relative to the lower section 112 of the back wall 104, when a portion of the PCB 202 is in contact with the lower section 112 as illustrated in FIG. 2, the uninsulated electrical elements 208, 210 are spaced from the upper section 110 by an air gap 222. Further, the uninsulated electrical elements 208, 210 may be positioned on the PCB 202 such that the uninsulated electrical elements 208, 210 and the housing 100 including the upper section 110 are separated by at least a particular distance.

To illustrate, the spacing (i.e., distance) between each one of the uninsulated electrical elements 208, 210 and a respective closest point on the housing 100 may meet or exceed a minimum spacing requirement, for example, to minimize safety risks. As an illustrative example, the double arrow 224 may represent a distance between the uninsulated electrical elements 210 and a closest point on the housing 100. For example, the distance between each one of the uninsulated electrical elements 208, 210 and a respective closest point on the housing 100 may meet or exceed an Underwriters Laboratories (UL) spacing requirement that is based on the voltage difference between a current carrying (live) element and a non-current carrying (dead) element. To illustrate, the spacing between each one of the uninsulated electrical elements 208, 210 and a respective closest point on the housing 100 may meet UL spacing requirement for 51 to 150 volts root mean squared (Vrms) voltage difference between the respective uninsulated electrical element 208, 210 and the housing 100. For example, the spacing between each one of the uninsulated electrical elements 208, 210 and the respective closest point on the housing 100 may be at least $1/8^{th}$ of an inch (i.e., 0.125 inch). To illustrate, the spacing between the uninsulated electrical element 208 and the respective closest point on the housing 100 may be 0.125 inch, and the spacing between the uninsulated electrical element 210 and the respective closest point on the housing 100 may be 0.125 inch or larger. As another example, the spacing between each one of the uninsulated electrical element 208, 210 and the respective closest point on the housing 100 may be approximately 0.375 inch.

In some example embodiments, the spacing between the uninsulated electrical elements 208, 210 and the housing 100 may be smaller than $1/8^{th}$ of an inch and meet UL spacing requirement for lower voltage difference between the uninsulated electrical elements 208, 210 and the housing 100. For example, the distance between each one of the uninsulated electrical elements 208, 210 and the respective closest point on the housing 100 may be at least 0.063 inch (i.e., approximately 1.6 millimeters), for example, for 0 to 50 volts root mean squared (Vrms) voltage difference between each one of the uninsulated electrical element 208, 210 and the housing 100. To illustrate, the spacing between the uninsulated electrical element 208 and the respective closest point on the housing 100 may be 0.063 inch, and the spacing between the uninsulated electrical element 210 and the respective closest point on the housing 100 may be 0.063 inch or larger. UL spacing requirements may be found, for example, in UL 1598, NMX-J-307/1-ANCE, C22.2 NO. 250.0-08, Sep. 17, 2008, which is incorporated herein by reference.

Because the section of the PCB 202 is in contact with the lower section 112 of the back wall 104 of the housing 100, heat from the PCB 202 can be efficiently transferred to the housing 100, which serves as a heat sink of the lighting fixture 200. Because the section of the PCB 202 is in contact with the lower section 112 does not include exposed electrical elements (e.g., exposed wire traces), the PCB 202 can be attached to lower section 112 without electrifying the housing 100 or causing electrical shorts on the PCB 202. Further, because of adequate spacing between the uninsulated electrical elements 208, 210 and the housing 100, the PCB 202 may operate at relatively high voltages (e.g., 120 Vrms) in compliance with UL spacing requirements.

In some example embodiments, the reflector 212 may be positioned within the housing 100 such that the LEDs 204 emit light toward the reflector 212. For example, the reflector 212 may abut against the PCB 202 such that the electrical components 206, 216 are separated from the LEDs 204 by the reflector 212. To illustrate, an edge of an opening of the reflector 212 may abut against the PCB 202 between the LEDs 204 and the electrical components 206, 216.

Although the PCB 202 is in contact with the lower section 112 of the back wall 104 as shown in FIG. 2, in some alternative embodiments, the PCB 202 may be close to the lower section 112 of the back wall 104 without being in direct contact with the lower section 112. In such embodiments, the lighting fixture 200 may still be compliant with UL spacing requirements because the PCB 202 does not include live uninsulated electrical elements on the back surface of the PCB 202 that is in contact with or close to the lower section 112 of the back wall 104.

Although the spacing requirement between each one of the uninsulated electrical elements 208, 210 and the housing 100 is described above with respect to UL spacing requirements, the lighting fixture 200 including the housing 100 may be designed to meet other more or less stringent spacing requirements. Further, although the spacing requirement for compliance with the UL spacing requirements is described with respect to the uninsulated electrical elements 208, 210 and the housing 100, the spacing requirements apply to air gaps separating all uninsulated current carrying elements attached to or of the PCB 202. Further, in some alternative embodiments, the spacing between the uninsulated electrical elements 208, 210 and the housing 100 may be smaller than the spacing required by UL spacing requirements for the voltage level on the uninsulated electrical elements 208, 210.

Figure 3:
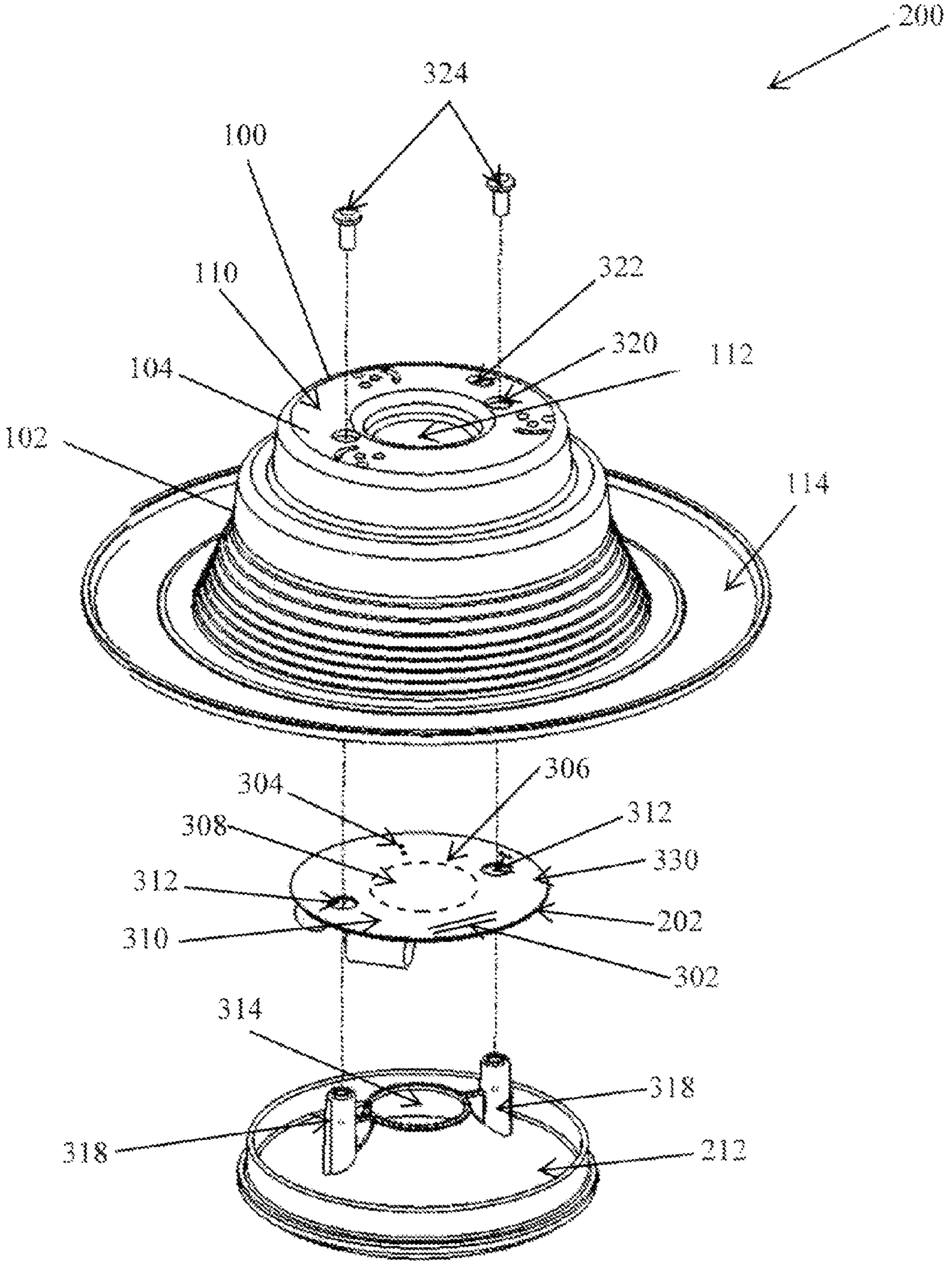
FIG. 3 illustrates an exploded view of the lighting fixture of FIG. 2 according to an example embodiment.

FIG. 3 illustrates an exploded view of the lighting fixture 200 of FIG. 2 according to an example embodiment. As illustrated in FIG. 3, the lighting fixture 200 includes the housing 100, the PCB 202, and the reflector 212. The housing 100 includes attachment holes 320 for receiving fasteners 324 therethrough for attaching the PCB 202 and the reflector 212 to the housing 100. The housing 100 may also include one or more wire holes 322 for extending electrical wires therethrough, for example, to the PCB 202. In alternative embodiments, the attachment holes 320 and/or the one or more wire holes 322 may be positioned on a different location on the back wall 104 or on other parts of the housing 100. In some alternative embodiments, the attachment holes 320 and/or the one or more wire holes 322 may be omitted.

In some example embodiments, the PCB 202 may include an attachment section 308 and an uninsulated element section 310 that are delineated for illustrative purposes by a dotted line circle 306. For example, at least a portion of the attachment section 308 may be contact with the lower section 112 of the back wall 104 of the housing 100 as shown in FIG. 2. The uninsulated element section 310 may extend out from the attachment section 308 toward the sidewall 102 such that the uninsulated element section 310 is not in contact with the lower section 112 of the back wall 104 when the PCB 202 is attached to the housing 100. The attachment section 308 of the PCB 202 may be centrally located on the PCB 202. Alternatively, the attachment section 308 may be off-center. For example, the attachment section 308 may be bound by one or more outer edges of the PCB 202. In general, the attachment section 308 may be located to correspond with the location of the lower section 112 in the back wall 104 of the housing 100.

As described above, the PCB 202 may include uninsulated electrical elements such as wire traces 302 and attachment nodes 304. For example, the wire traces 302 and the attachment nodes 304 may correspond to the uninsulated electrical elements 208, 210 shown in FIG. 2. As illustrated in FIG. 3, the wire traces 302 and the attachment nodes 304 may be on a back surface 330 of the PCB 202. For example, the wire traces 302 and the attachment nodes 304 may be on the uninsulated element section 310 of the PCB 202. Because at least a portion of the attachment section 308 of the PCB 202 comes in contact with the lower section 112 of the back wall 104, the attachment section 308 does not include current carrying uninsulated electrical elements that can come in contact with the lower section 112.

Because the wire traces 302 and the attachment nodes 304 can carry current when power is provided to electrical components attached to the PCB 202, the wire traces 302 and the attachment nodes 304 are located in the uninsulated element section 310 of the PCB 202 such that each one of the wire traces 302 and the attachment nodes 304 is separated from the housing 100 by an air gap. The spacing between each one of the wire traces 302 and the housing 100 may meet or exceed a minimum spacing requirement for the voltage level on the wire traces 302. Similarly, the spacing between each one of the attachment nodes 304 and the housing 100 may meet or exceed a minimum spacing requirement for the voltage level on each one of the attachment nodes 304. As described above, the spacing between each one of the wire traces 302 and the housing 100 and the spacing between each one of the attachment nodes 304 and the housing 100 may be compliant with UL or other spacing requirements.

In some example embodiments, the PCB 202 includes attachment holes 312 for attaching the PCB 202 with the housing 100. To illustrate, the reflector 212 may include bosses 318 that extend up toward the back wall 104. The fasteners 324 (e.g., plastic screws) may extend through the attachment holes 320 in the back wall 104 and through the attachment holes 312 in the PCB 202 to attach the housing 100, the PCB 202, and the reflector 212 together. Alternatively, the bosses 318 may extend upward through the attachment holes 312 of the PCB 202, and the fasteners 324 may extend through the attachment holes 320 of the back wall 104 to attach to the bosses 318 such that the housing 100, the PCB 202, and the reflector 212 are attached together by the fasteners 324.

In some example embodiments, the reflector 212 may include an opening 314. A perimeter of the opening 314 may abut against the PCB 212 such that LEDs (e.g., the LEDs 204 shown in FIG. 2) are within the perimeter of the opening 314. For example, the reflector 212 may be a white or another color that reflects light from the LEDs toward an area to be illuminated by the lighting fixture 200.

Although the PCB 202 is shown as having a circular shape, in alternative embodiments, the PCB 202 may have other shape such as a rectangular shape. Further, the attachment section 308 and the uninsulated element section 310 may have other shapes that may or may not be the same shape as the PCB 202. For example, the attachment section 308 may have a rectangular outer perimeter, and the uninsulated element section 310 may have a circular outer perimeter and a rectangular inner perimeter matching the outer perimeter of the attachment section 308. Further, the attachment section 308 and the uninsulated element section 310 may be positioned at opposite ends of the PCB 202.

In some example embodiments, the PCB 202 may include fewer or more current carrying uninsulated electrical elements on the back surface 330 of the PCB 202 than shown in FIG. 3. Further, although the wire traces 302 and the attachment nodes 304 are shown in FIG. 3 as current carrying uninsulated electrical elements that are on the back surface 330 of the PCB 202, other current carrying uninsulated electrical elements may also be positioned on the back surface 330 of the PCB 202 at the uninsulated element section 310.

Although the PCB 202 and the reflector 212 may be attached to the housing 100 using the fasteners 324 as described above, in alternative embodiments, the PCB 202 and the reflector 212 may be attached to the housing 100 and/or to each other in a different manner. For example, the PCB 202 may be attached to the housing 100, and the reflector 212 may be separately attached to the PCB 202 or to the housing 100. Further, the reflector 212 may have fewer or more than two bosses and may have a shape other than shown in FIG. 3.

Figure 4:
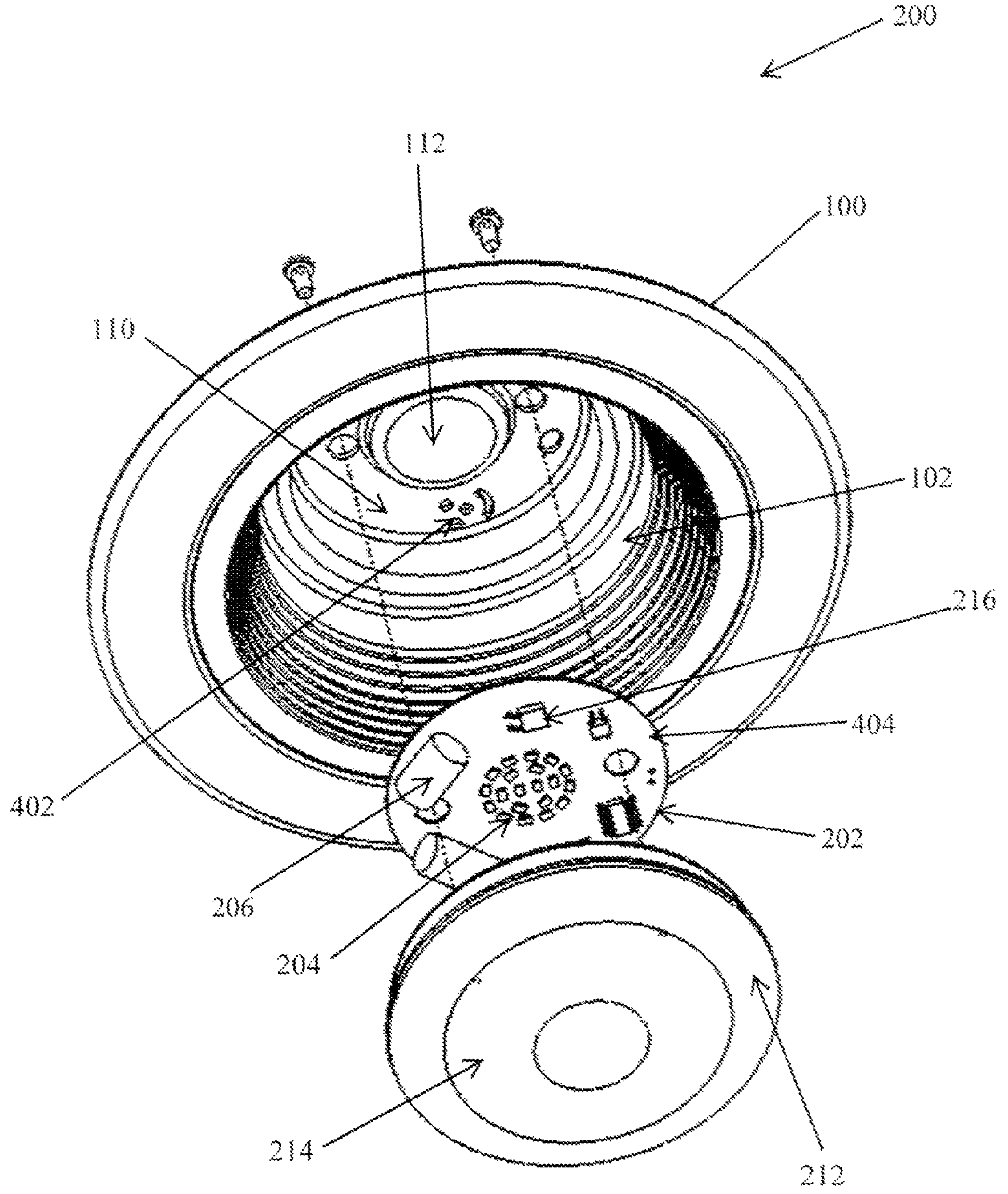
FIG. 4 illustrates another exploded view of the lighting fixture of FIG. 2 according to an example embodiment.

FIG. 4 illustrates another exploded view of the lighting fixture of FIG. 2 according to an example embodiment. As illustrated in FIG. 4, the lighting fixture 200 includes the housing 100, the PCB 202, the reflector 212, and the lens 214. The lens 214 is attached to the reflector 212 such that light reflected by the reflector 212 may be emitted out through the lens 214. For example, light from the LEDs 204 that is emitted toward the reflector 212 and reflected by the reflector 212 may be emitted out through the lens 214. Further, some of the light from the LEDs 204 may be emitted out through the lens 214 without be reflected by the reflector 212.

In some example embodiments, the housing 100 may include mounting holes 402 for mounting the lighting fixture 200 to a structure such as a ceiling structure. For example, the housing 100 may be mountings using one or more fasteners (e.g., screws, nails, etc.) that extend upward through the mounting holes 402. In alternative embodiments, the housing 100 may be retained behind a ceiling using means other than fasteners that extend through the mounting holes 402. Further, in some alternative embodiments, the mounting holes 402 may be located on other parts of the housing 100 instead of the upper section 110.

In some example embodiments, the electrical components 206, 216 and the LEDs 204 may be attached to the PCB 202 as shown in FIG. 2. For example, the electrical components 206, 216 and the LEDs 204 may be attached to the PCB 202 on a front surface 404 of the PCB 202. The front surface 404 and the back surface 330 of the PCB 202 are on opposite sides of the PCB 202. In contrast to the back surface 330 of the PCB 202, the front surface 404 faces away from the upper section 110 and the lower section 112 of the back wall 104 of the housing 100.

The electrical components such as the electrical components 206, 216 may be disposed on a front side of the PCB 202. Similarly, the LEDs 204 may be disposed on the front side of the PCB 202 as shown in FIG. 4. Terminals of the electrical components 206, 216 may be attached to the PCB 202 by soldering or other means at attachment nodes that are exposed on the back side of the PCB 202. In contrast, the LEDs 204 may be attached to the PCB such that current carrying electrical elements such as terminals of the LEDs 204 or attachment nodes related to the terminals of the LEDs 204 are not exposed on the back side of the PCB 202. For example, the LEDs 204 may be attached to the PCB 202 within the attachment section 308 of the PCB 202 shown in FIG. 3 such that attachment of the PCB 202 to the lower section 112 of the housing 100 as described above does not electrify the housing 100 or cause electrical shorts on the PCB 202.

In FIG. 4, although the LEDs 204 form a circular outer perimeter on the PCB 202, in alternative embodiments, the LEDs 204 may form a different pattern. For example, the LEDs 204 may be attached to the PCB 202 to form a rectangular pattern. In some alternative embodiments, the LEDS 204 may be in clusters that are separated from each other. Further, the LEDs 204 may be positioned on the PCB 202 at locations other than shown in FIG. 4. In some example embodiments, few or more LEDs 204 than shown in FIG. 4 may be attached to the PCB 202. Further, in some example embodiments, fewer or more electrical components, such as the electrical components 206, 216, than shown in FIG. 4 may be attached to the PCB 202. In some alternative embodiments, light sources other than LEDs may be attached to the PCB 202.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A heat dissipating housing for a lighting device, comprising:

a back wall comprising an upper section and a lower section; and a sidewall extending down from the upper section of the back wall, wherein the back wall and the sidewall define a cavity of the housing, wherein the upper section of the back wall is elevated from the lower section of the back wall such that when a printed circuit board (PCB) is in contact with the lower section of the back wall within the cavity, an uninsulated electrical element on a back side of the PCB is separated by an air gap from a closest point on the housing by a distance that is at least 0.063 inch, wherein the back side of the PCB faces the upper section of the back wall.

2. The heat dissipating housing of claim 1, wherein when the PCB is in contact with the lower section of the back wall within the cavity, the housing dissipates heat transferred from the PCB to the lower section of the back wall.

3. The heat dissipating housing of claim 1, wherein the distance is compliant with an Underwriters Laboratories (UL) spacing requirement.

4. The heat dissipating housing of claim 1, wherein the distance is at least 0.125 inch.

5. The heat dissipating housing of claim 1, wherein the uninsulated electrical element includes a wire trace included within the PCB.

6. The heat dissipating housing of claim 1, wherein the lower section of the back wall is centrally located in the back wall.

7. The heat dissipating housing of claim 1, wherein the sidewall of the housing extends down from an outer perimeter of the upper section of the back wall.

8. A lighting device, comprising:

a housing having a back wall and a sidewall, the back wall and the sidewall defining a cavity of the housing, wherein the back wall comprises an upper section and a lower section; and a printed circuit board (PCB) disposed within the cavity of the housing, wherein an attachment section of the PCB is in contact with the lower section of the back wall, wherein an uninsulated section of the PCB extends from the attachment section of the PCB and includes an uninsulated electrical element on a back side of the PCB, the back side of the PCB facing the upper section of the back wall, wherein the uninsulated electrical element is separated by an air gap from a closest point on the housing by a distance that is at least 0.063 inch.

9. The lighting device of claim 8, wherein the housing dissipates heat transferred from the PCB to the lower section of the back wall.

10. The lighting device of claim 8, wherein the distance is compliant with an Underwriters Laboratories (UL) spacing requirement.

11. The lighting device of claim 8, wherein the uninsulated electrical element includes a wire trace included within the PCB.

12. The lighting device of claim 8, further comprising an electrical component disposed on a front side of the PCB, the front side of the PCB faces away from the upper section and the lower section of the back wall, wherein a terminal of the electrical component is attached to the uninsulated section of the PCB at an electrical node, wherein the uninsulated electrical element includes the electrical node.

13. The lighting device of claim 8, further comprising a light source attached to the PCB on a front side of the PCB, wherein the front side of the PCB faces away from the upper section and the lower section of the back wall.

14. The lighting device of claim 8, wherein the attachment section of the PCB is centrally located on the PCB.

15. The lighting device of claim 8, wherein the housing is made from an electrically conductive material.

16. A lighting device, comprising:

a housing having a back wall and a sidewall, the back wall and the sidewall defining a cavity of the housing, wherein the back wall comprises an upper section and a lower section;

a printed circuit board (PCB) disposed within the cavity of the housing, wherein an attachment section of the PCB is in contact with the lower section of the back wall, wherein an uninsulated element section of the PCB extends from the attachment section of the PCB and includes an uninsulated electrical element on a back side of the PCB, the back side of the PCB facing the upper section of the back wall, wherein the uninsulated electrical element is separated by an air gap from a closest point on the housing by a distance that is at least 0.063 inch; and a light source attached to the attachment section of the PCB on a front side of the PCB, wherein the front side of the PCB faces away from the upper section of the back wall.

17. The lighting device of claim 16, wherein the housing dissipates heat transferred from the PCB to the lower section of the back wall.

18. The lighting device of claim 16, wherein the distance is compliant with an Underwriters Laboratories (UL) spacing requirement.

19. The lighting device of claim 16, further comprising a reflector positioned below the light source.

20. The lighting device of claim 19, further comprising a lens positioned below the reflector such that light from the light source that is reflected by the reflector is emitted out through the lens.

* * * * *